Figure 1:
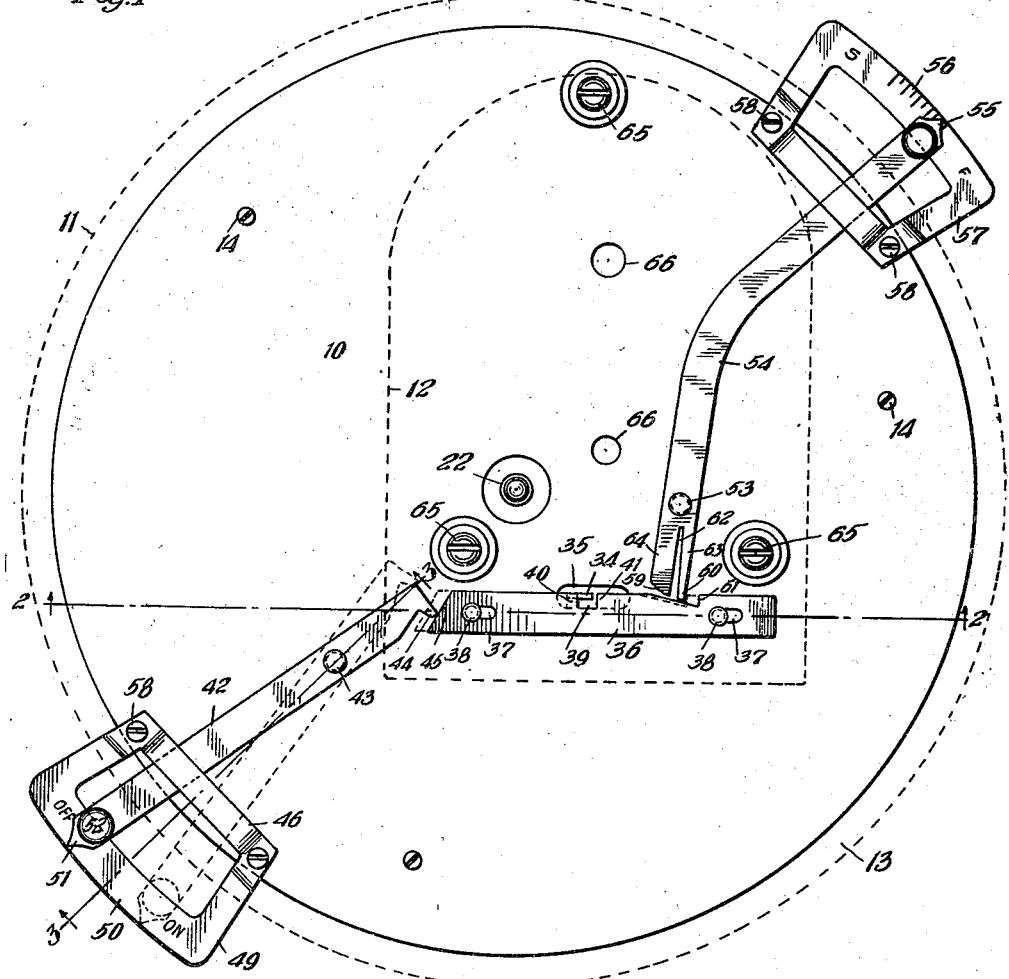

C. T. FRANTZ.
CONTROLLED VARIABLE SPEED MOTOR MECHANISM.
APPLICATION FILED MAY 6, 1920.

1,437,233.

Patented Nov. 28, 1922.
2 SHEETS—SHEET 1.

Inventor
Charles T. Frantz
By Geo. I. Haight
Atty.

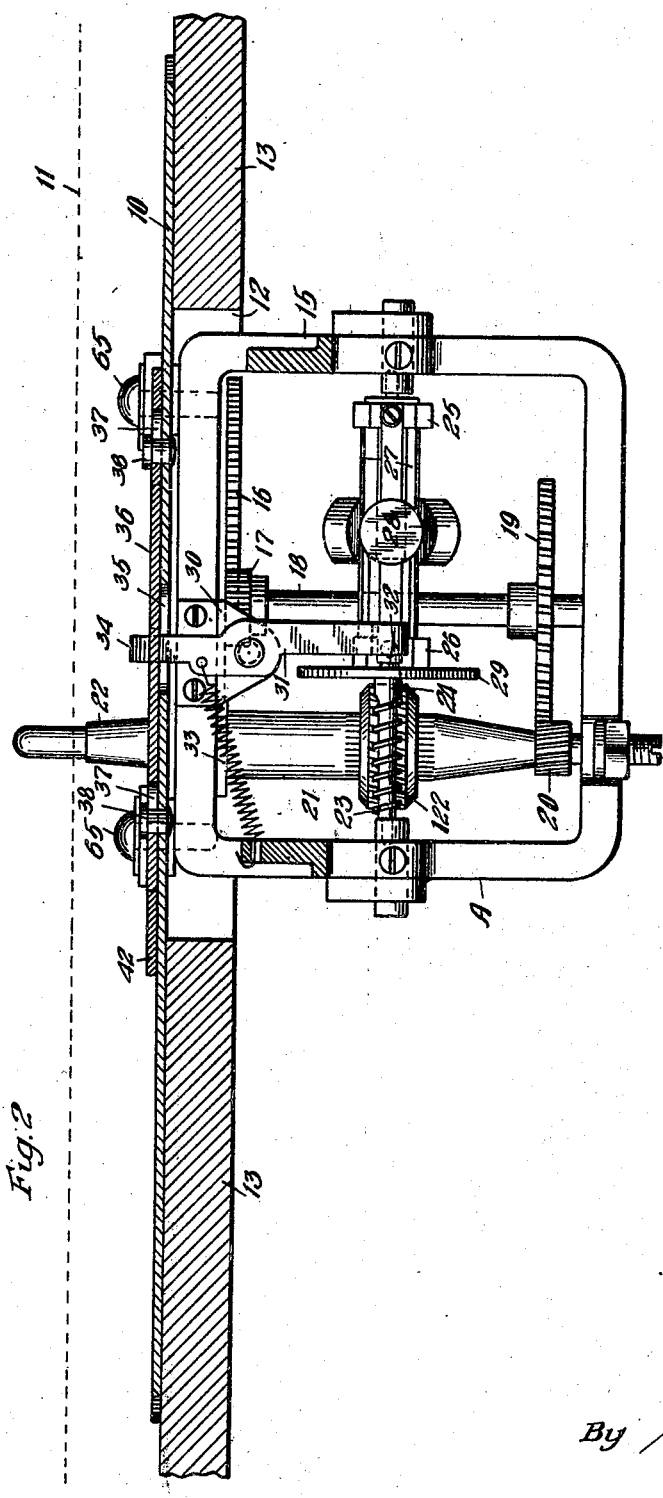

Patented Nov. 28, 1922.

1,437,233

UNITED STATES PATENT OFFICE.

CHARLES T. FRANTZ, OF CHICAGO, ILLINOIS.

CONTROLLED VARIABLE-SPEED MOTOR MECHANISM.

Application filed May 6, 1920. Serial No. 379,235.

*To all whom it may concern:*

Be it known that I, CHARLES T. FRANTZ, a citizen of United States, residing at Chicago, in the county of Cook and State of Illinois, have invented a certain new and useful Improvement in Controlled Variable-Speed Motor Mechanism, of which the following is a full, clear, concise, and exact description, reference being had to the accompanying drawings, forming a part of this specification.

This invention relates to improvements in controlled variable speed motor mechanism.

In the art of phonographs, it has heretofore been the most common practice in the case of phonographs of the better types, to employ a manually operable brake cooperating with the rotatable disc-carrying table to control the stopping and starting of the motor. To control the tempo, separate devices have usually been employed involving a scale, a pivoted or slidable lever, means extending downwardly through an independent opening on the motor board and connections from said means to the motor to control the speed of the latter. As is well known, the motor and parts are usually made at manufacturing plants and shipped to other plants where they are assembled with the cabinets. With the arrangements heretofore used, it has been necessary, at the assembling plants, for the operators to use extreme care in cutting out a proper opening to accommodate the motor and to accurately locate the separate opening in the motor board to accommodate those parts of the tempo regulator that pass therethrough. It is evident that with such mechanisms of the prior art and the method of assembly employed in connection therewith, accurate adjustment of the movable pointer of the tempo regulator in conjunction with the scale is attended with considerable difficulty and requires highly skilled labor and unusual expense.

One of the objects of my invention is to provide an assembly consisting of the motor, the stopping and starting device, and the tempo regulator all mounted on a unitary structure and capable of being entirely assembled and accurately adjusted before shipment from the factory where the motors are made so that, when the motors and associated parts are assembled on the cabinet at a different plant, no adjustments will then be necessary and the assembly may be made without necessitating the extreme accuracy and carefulness heretofore required, thereby reducing labor costs and insuring uniform accuracy in the control of the tempo.

Another object of my invention is to provide a variable speed motor having controlling mechanism associated therewith to effect complete stoppage of the motor when desired and also means for regulating the tempo and in which the stopping and starting device and the tempo regulating device operate with common means to effect both purposes.

Other and further objects of the invention will more clearly appear from the description hereinafter following.

In the drawings forming a part of this specification, Figure 1 is a top plan view of a motor and associated controlling parts as the same are assembled in a unitary arrangement and as the parts would be shipped from the motor manufacturing factory and applied to the motor board of a phonograph. In said figure, the large dotted circle indicates the usual disc-carrying table and the dotted outlines surrounding the dotted indication of the motor proper illustrate the opening which may be cut in the motor board to accommodate the motor. Figure 2 is a vertical enlarged sectional view corresponding substantially to the line 2—2 of Figure 1, Figure 2 being on a substantially full scale and Figure 1 on approximately a two-thirds scale of the actual device. And Figure 3 is a detail sectional view corresponding substantially to the line 3—3 of Figure 1.

In said drawings, 10 denotes a base plate or assembly plate to which the various parts of the motor and its adjuncts are adapted to be applied. Said plate 10 will preferably be made circular of a diameter somewhat less than the diameter of the usual disc-carrying tables indicated at 11 and of sufficient area so as to completely cover and extend beyond the outlines of the motor indicated broadly by the letter A. In this manner, it is evident that the plate 10 will be substantially concealed when in the complete phonograph and also that the opening 12 required in the motor board to permit the insertion of the motor may be cut of appreciable larger area than the area of the motor itself in plan and without the necessity of accurate fit, said opening in the motor board being fully covered by the plate 10 when secured in place.

Said plate may be secured to the motor board 13 by any suitable means such as the plurality of screws 14. In this connection, it will be noted that only the one opening, 12, is required to be cut in the motor board and this without necessity for any particular degree of accuracy.

The motor designated generally by the letter A may be of any suitable design, the one shown in the drawing being of the spring type and involving a frame 15, spring driven gear 16, pinion 17, shaft 18, gear 19 thereon, pinion 20, and the table-rotating shaft 21 which extends upwardly through the plate 10 and has a suitably tapered section 22 to accommodate the usual hub of the disc-carrying table and by which the latter is adapted to be rotated. Mounted on the shaft 21 is a worm gear 122 with which cooperates a worm 23 on the horizontally extending governor shaft 24. Said shaft 24 is provided with a governing device, the same including a block 25 rigidly secured to the shaft, a block 26 slidably mounted on the shaft, a plurality of spring bars 27 connected at their ends to the blocks 25 and 26, centrifugal weights 28 mounted on the spring bars 27, and a disc 29 rigid and slidable with the block 26. As will be evident as the motor speeds up, the weights 28, will be thrown out centrifugally and the disc 29 will travel toward the right on the shaft 24, as viewed in Figure 2.

To stop the motor, I employ the following arrangement. Mounted on a suitable bracket 30 carried by the motor frame is a pivoted lever 31, the lower end of which carries a brake pad 32 adapted to engage the disc 29 preferably near its periphery. The lever 31 is normally impelled in a direction to withdraw the brake pad 32 from the disc 29 by a suitable tension spring 33, one end of which is attached to the lever 31 above the pivot and the other end of which is attached to the motor frame, as clearly shown in Figure 2. The upper end 34 of the lever 31 extends through an elongated slot 35 in the bed plate 10, the slot 35 being such that the lever may oscillate therein within the necessary limits. A plate 36 is slidably mounted on the top of the bed plate 10, the plate 36 being slotted near its ends as indicated at 37—37 through which extend rivets 38—38 to permit of the sliding movement referred to. One side of the plate 36 is notched as indicated at 39 so as to provide opposed shoulders 40 and 41 on the opposite sides of the extended end 34 of the lever 31. As will be apparent, the position of the shoulder 40 on the plate 36 governs the position of the lever 31.

The full line position of the plate 36 shown in Figure 1 indicates the condition where the motor is stopped, that is, with the plate 36 to its extreme position to the right as viewed in Figure 1 and with the disc 29 to its extreme lefthand position as viewed in Figure 2 and the brake pad 32 bearing thereon with sufficient pressure to stop rotation of the disc 29 and consequently of the motor proper. To actuate the plate 36 to its full stop position, I employ a pivoted manually operable stopping and starting lever 42 which is pivoted intermediate its ends to the bed plate 10 as by the rivet 43. The inner end 44 of said lever 42 is arranged to engage the beveled adjacent end 45 of the plate 36 so as to force the latter to the right when the lever 42 assumes the full line position shown in Figure 1. The outer end of the lever 42 extends under an upwardly offset strap 46 which is preferably formed integrally with a substantially rectangular plate 49, the outer strap 50 of said plate being located under the extreme or pointer end 51 of said lever 42. A suitable knob 52 may be used on the lever 42 to facilitate the manual positioning thereof and suitable lettering may be employed on the plate 49 to indicate the off and on positions of the said lever. In actual practice, the offset strap 46 will be made such that friction is maintained between said strap, the lever 42 and the plate 10 so that the lever 42 will remain in any adjusted position thereon. The dotted position of the lever 42 corresponds to the condition when the motor is running and when the plate 36 is moved to the left to the limit hereinafter described, under the influence of the lever 31 and spring 33.

To regulate the tempo, I employ the following arrangement. Pivotally mounted on the upper side of the plate 10 about the rivet 53 is a tempo lever 54. The outer end of said lever 54 extends beyond the periphery of the plate 10 and preferably has a pointer 55 arranged to cooperate with a tempo scale 56 formed on a plate 57 of similar construction to the plate 49. Said lever 54 is also preferably provided with a knob at its outer end to facilitate manual adjustment thereof and will be frictionally held between the plate 57 and the plate 10 in the same manner as described in connection with the lever 42. In actual practice, the rectangular plates 49 and 57 will be formed as stampings separate from the plate 10 and attached to the latter by screws 58. It will be noted that the lever 54 is so mounted as to provide a relatively long arm from the pivot 53 to the pointer end and a relatively short arm from the pivot 53 to the opposite end of said lever so that relatively minute adjustments can be obtained of the inner end of said lever. Also, in actual practice, the plates 57 and 49 will preferably be located at substantially diametrical points on the plate 10. The inner end of the lever 54 is beveled as indicated at 59 and provides a shoulder 60 opposed to a corresponding shoulder 61 on the plate 36, the latter being suitably notched to accommodate the movements of the inner end of said lever 54 as will be apparent from an examination of Figure 1. By adjusting the lever 54 in accordance with the scale 56, it is evident that a corresponding adjustment of the shoulder 60 will occur and consequently when the starting lever 42 is moved to the "on" position, the plate 36 will be shifted to the left, as viewed in Figure 1, until the shoulder 61 thereof engages the shoulder 60. In other words, the position of the shoulder 60 will determine the position of the lever 31 and its braking pad 32 and this in turn will limit the action of the governing device proper of the motor to any determined desired speed. In actual practice, the inner end of the tempo lever 54 may be slotted as indicated at 62 so as to provide a relatively narrow tang 63 carrying the shoulder 60 and a relatively wider more substantial tang 64. With this construction, it is evident that the position of the shoulder 60 with respect to the pointer on the outer end of the lever 54 may be easily adjusted by either spreading the tangs 63 and 64 or by pinching them together so as to insure absolute correspondence of the shoulder 60 with the tempo or rotative speed called for by the scale 56, it being understood that, on account of the relatively light and weak tangs 63 and 64, the light tang will be flexed with respect to the heavier tang 64, the latter constituting a rigid part of the entire lever 54.

The motor frame is arranged to be secured to the bed plate 10 by any suitable means such as the plurality of screws 65 and perforations 66 may be made in the plate 10 in order to permit access to certain bearings of the motor to permit either oiling or adjustment thereof without the necessity of disassembling the motor from the bed plate.

With the construction hereinbefore described, it is evident that the motor and its associated controlling parts can be accurately assembled and adjusted prior to the unitary assembly leaving the factory and that all parts are readily accessible for inspection and such adjustment so that, when the motor is assembled in the cabinet, no further adjustments are required and absolute accuracy is obtained. As hereinbefore described, it is only necessary for the assemblers to cut a single opening 12 in the motor board, which need not be accurately located, to permit the application of the motor and its associated parts to the motor board and the entire device presents a neat finished appearance.

Although I have herein shown and described what I now consider the preferred manner of carrying out the invention, the same is merely illustrative and I contemplate all changes and modifications that come within the scope of the claims appended hereto.

I claim:

1. In a variable speed motor mechanism of the character described the combination with a motor having a governor; of a manually operable stopping and starting member; a manually adjustable tempo regulating member; and movable means, common to both of said members and interposed between them and said governor and cooperable therewith, arranged to either stop the motor or limit its speed to a predetermined degree corresponding to the manually adjusted position of said tempo member.

2. In a variable speed motor mechanism of the character described the combination with a motor; of adjustable devices arranged, in one extreme position, to stop the motor and in other adjustable positions to determine the speed of the motor; manually operable means cooperating with said devices adapted to predetermine and limit said adjustable positions of said devices; and movable means also cooperable with said devices adapted to actuate the latter to assume said extreme position and thereby stop the motor, said movable means being adapted to assume a position of inoperativeness with respect to said devices.

3. In a variable speed motor mechanism of of the character described, the combination with a motor; of adjustable devices arranged, in one extreme position, to stop the motor and in other adjustable positions to determine the speed of the motor, said devices including a centrifugal governor having a movable disc and a brake cooperable therewith; manually adjustable means cooperating with said devices adapted to predetermine and limit said adjustable positions of said devices; and movable means also cooperating with said devices adapted to actuate the latter to assume said extreme position and thereby stop the motor, said movable means being adapted to assume a position of inoperativeness with respect to said devices.

4. In a variable speed motor mechanism of the character described, the combination with a motor; of adjustable devices adapted to either stop or regulate the speed of said motor, said devices including, a centrifugal governor having a movable disc, a pivoted lever having a brake thereon cooperable with the disc, and a slidable shouldered plate engaging the lever; manually adjustable means cooperable with said plate adapted to predetermine and limit the position thereof; and movable means also cooperable with said plate adapted to actuate the latter to assume an extreme position to stop the motor, said movable means being also adapted to assume a position of inoperativeness with respect to said plate.

5. In a variable speed motor mechanism of the character described, the combination with a motor; of adjustable devices arranged, in one extreme position, to stop the motor and in other adjustable positions to determine the speed of the motor; a manually adjustable frictionally held lever cooperable with said device, said lever having an indicator scale associated therewith; and movable means also cooperable with said devices adapted to actuate the latter to assume said extreme position and thereby stop the motor.

6. In a variable speed motor mechanism of the character described, the combination with a motor; of adjustable devices arranged, in one extreme position, to stop the motor and in other adjustable positions to determine the speed of the motor; manually adjustable means cooperable with said devices and adapted to determine and limit said adjustable positions thereof; and a manually adjustable frictionally held lever adapted to cooperate with said devices to actuate the latter to assume said extreme position and thereby stop the motor.

7. In a variable speed motor mechanism of the character described, the combination with a motor; of governing means associated with said motor including a slidable plate having a shoulder thereon; a manually adjustable pivoted tempo lever cooperable with said shoulder of the plate to limit its movements in one direction, said tempo lever having an indicator scale associated therewith; and a manually operable pivoted lever adapted also to cooperate with said slidable plate to actuate it in a direction to effect stoppage of the motor.

8. In a variable speed motor mechanism of the character described, the combination with a motor; of governing means associated with said motor including a slidable plate having a shoulder thereon; a manually adjustable pivoted tempo lever cooperable with said shoulder of the plate to limit its movements in one direction, said tempo lever having an indicator scale associated therewith; and a manually operable pivoted lever adapted also to cooperate with said slidable plate to actuate it in a direction to effect stoppage of the motor, each of said levers being frictionally held in adjusted positions.

9. In a variable speed motor of the character described, the combination with the motor proper; of manually adjustable means for predetermining and limiting the speed of said motor, said means including a pivoted lever one end of which is slotted to provide spaced relatively narrow and wide tangs whereby the effective position of the narrow tang may be adjusted with respect to the main part of said lever by either spreading or pinching said narrow tang with respect to the wider tang.

In witness that I claim the foregoing I have hereunto subscribed my name this 27th day of Apr. 1920.

CHARLES T. FRANTZ.

Witnesses:
 CARRIE GAILING,
 JOSEPH HARRIS.